358-140. OR 3,830,971 SR

United States Patent [19]
van de Polder

[11] 3,830,971
[45] Aug. 20, 1974

[54] LINE STANDARD CONVERTER FOR CONVERTING A TELEVISION SIGNAL HAVING A NUMBER OF N-LINES PER IMAGE INTO A TELEVISION SIGNAL HAVING A NUMBER OF M-LINES PER IMAGE

[75] Inventor: Leendert Johan van de Polder, Emmasingel, Netherlands

[73] Assignee: U.S. Philips Corporation, New York, N.Y.

[22] Filed: Aug. 30, 1972

[21] Appl. No.: 285,017

[30] Foreign Application Priority Data

Sept. 4, 1971 Netherlands ...................... 7112212

[52] U.S. Cl. ..... 178/6.8, 178/DIG. 24, 179/15.55 T
[51] Int. Cl. ............................................ H04n 5/46
[58] Field of Search ...................... 178/DIG. 24, 6.8; 179/15.55 T

[56] References Cited

UNITED STATES PATENTS

| | | | |
|---|---|---|---|
| 2,696,523 | 12/1954 | Theile | 178/DIG. 24 |
| 3,193,619 | 7/1965 | Sennhenn | 178/DIG. 24 |
| 3,621,150 | 11/1971 | Pappas | 179/15.55 T |
| 3,715,509 | 2/1973 | Dawson | 179/15.55 T |

*Primary Examiner*—Howard W. Britton
*Attorney, Agent, or Firm*—Frank R. Trifari

[57] ABSTRACT

Line standard converter for a conversion ratio of substantially one-half or substantially 2, in which an intricate interpolation circuit can be omitted by writing and reading at regular time distances of line periods of a video signal in a number of line stores adapted to the deviation of the conversion ratio of the value one-half or 2.

7 Claims, 4 Drawing Figures

T5055

LINE STANDARD CONVERTER FOR CONVERTING A TELEVISION SIGNAL HAVING A NUMBER OF N-LINES PER IMAGE INTO A TELEVISION SIGNAL HAVING A NUMBER OF M-LINES PER IMAGE

The invention relates to a line standard converter for converting a television signal having a number of $n$ lines per image into a television signal having a number of $m$ lines per image while maintaining the number of images per second, a television signal input of the line standard converter being coupled to a switchable storage circuit comprising a plurality of switchable line stores whose write period has a value differing from the read period, the conversion ratio of the line standard converter between $n$ and $m$ being substantially equal to one-half.

United Kingdom Patent Specification 790,219 describes the possibility of such a line standard converter from 819 to 409½ lines. Furthermore this United Kingdom patent specification describes a line standard converter from $n$ to three-fifths $n$ lines which writes 3 lines at irregular line distances in line stores from a group of 5 lines from the original signal and reads these lines by means of adaptation of the read period in a regular time sequence. The converters described in the United Kingdom Patent Specification operate without an intricate switchable interpolation circuit at the input end of the circuit.

The drawback of the converters stated in the said United Kingdom Patent Specification is that the newly obtained television standard is either an unconventional one having a broken number of lines or a standard in which irregularities in the newly obtained signal occur due to the conversion at irregular time distances of original lines into lines for the new standard.

An object of the invention is to obviate these drawbacks and to maintain the advantage of the absence of an interpolation circuit.

To this end a television standard converter of the kind described in the preamble is characterized in that the switchable storage circuit comprises a plurality of line stores which is at least equal to $(2+\frac{1}{2}q)$ for $q$ = zero or positive even (0, 2, 4, . . . . . . .), and is equal to $(2\frac{1}{2}+\frac{1}{2}q)$ for $q\frac{1}{2}$= positive odd (1, 3, 5. . . . .), in which $q$ for $m > \frac{1}{2}n$ is equal to $m - \frac{1}{2}n - \frac{1}{2}$ and for $n < \frac{1}{2}m$ *is equal to* $(\frac{1}{2}n - m - \frac{1}{2})$ while furthermore for a value of $m$ which is one less than a multiple of 4, $q$ is odd (1, 3, 5. . . . . . .) when $m > \frac{1}{2}n$ and $q$ is even (0, 2, 4, . . . . . .) when m $< \frac{1}{2}n$ and for a value of $n$ which is once more than a multiple of four, $q$ is odd when m $<\frac{1}{2}n$ and $q$ is even when $m > \frac{1}{2}n$, while $m$ and $n$ are odd and are mutually exchangeable.

By using a plurality of line stores adapted in this manner it is possible in a simple manner to store information from lines of the original standard in a very regular manner during a field period of the image and can be converted into lines of the new standard, so that disturbing phenomena in an image according to the new standard are prevented and in which the new standard has a number of image lines conventionally used for normal television systems. The invention is based on the recognition of the fact that for regular writing and reading the line stores for converters for conventional systems in which the conversion ratio must deviate slightly from one-half or 2 must have a variable period of engagement (i.e., the sum of write period, stand-by period and read period) so that the number of line store to be used is determined by the maximum period of engagement per line store.

A television standard converter according to the invention is particularly suitable for converting a signal according to a conventional system into a signal for a videophone system, and conversely.

The invention will now be described with reference to the drawing.

Figure 1:
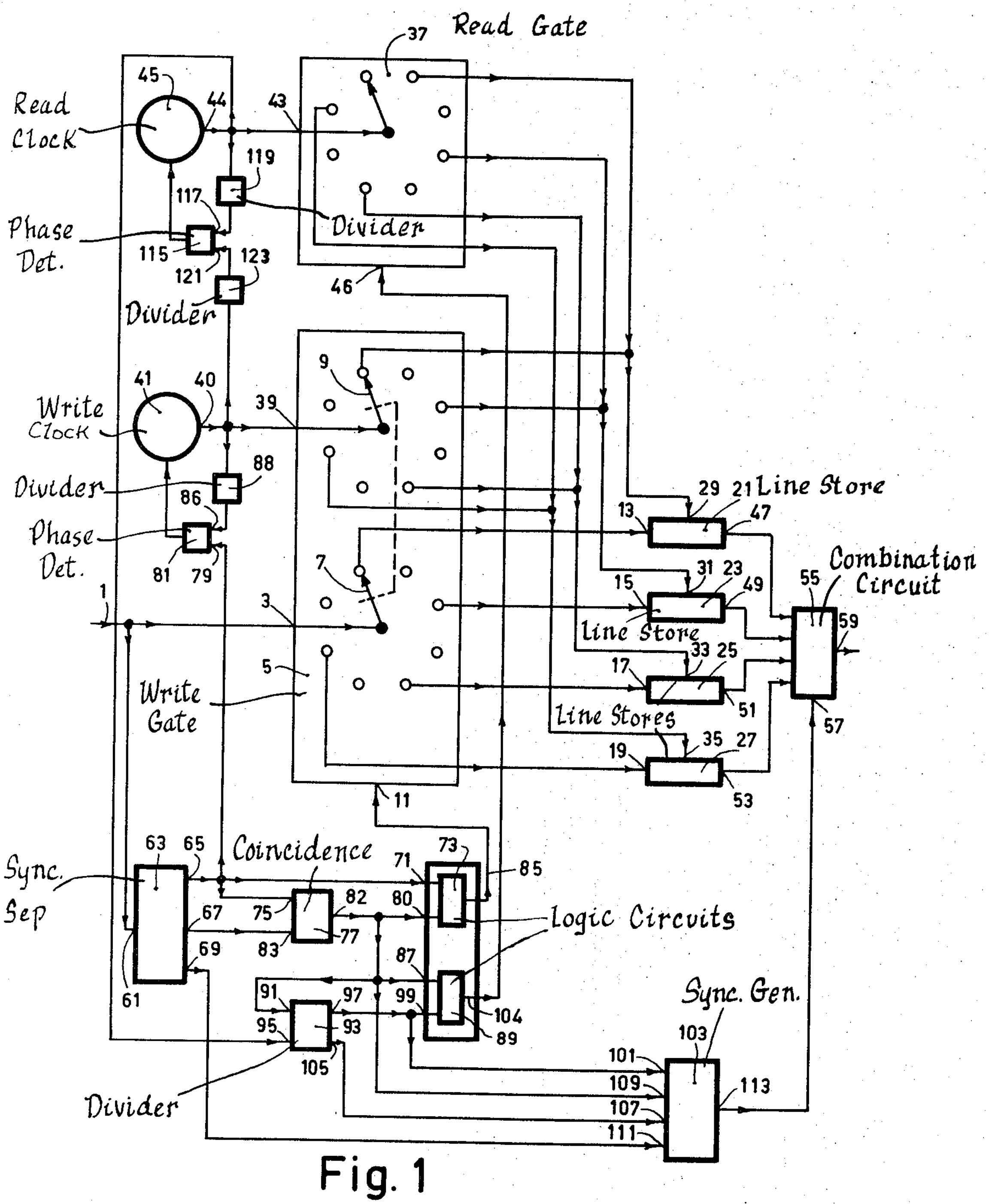
FIG. 1 shows by way of a block diagram a line standard converter according to the invention suitable for conversion from 325 to 267 lines.

In FIG. 1 a video signal input 1 of the line standard converter is connected to a first input 3 of a write gate combination 5. The write gate combination 5 has a first gating circuit 7 and a second gating circuit 9 which are operated synchronously by operating or gating signals to be applied to an operating signal input 11 which is shown by a connection only for the sake of clarity. For the sake of clarity the gating circuits 7 and 9 are shown as coupled rotating switches in the Figure.

The first gating circuit 7 provides for the distribution of the video signal applied to the first input 3 to a plurality of inputs 13, 15, 17 and 19 of line stores 21, 23, 25 and 27. These line stores may be, for example, of a shift store type, analog or digital dependent on the nature of the video signal to be processed and they require a clock signal for shifting the write and read information. To this end clock signal inputs 29, 31, 33, 35 of each of the line stores 21, 23, 25 and 27 are connected to an output of the second gating circuit 9 and to an output of a read gate circuit 37 shown as a rotating switch. An input 39 of the second gating circuit 9 is connected to an output 40 of a write clock signal generator 41 and an input 43 of the read gate circuit 37 is connected to an output 44 of a read clock signal generator 45. The read gate circuit 37 has an operating signal input 46 which is shown in its single version for the sake of clarity.

Outputs 47, 49, 51 and 53 of each of the line stores 21, 23, 25 and 27 are connected to a combination circuit 55 a further input 57 of which receives a new synchronizing signal. An output 59 of the combination circuit 55 constitutes the output of the line standard converter.

Furthermore the video signal input 1 is connected to an input 61 of a synchronizing pulse separator 63. The synchronizing pulse separator 63 has a line signal output 65 from which a signal of the line frequency $f_1$ of the incoming video signal is obtained, an image signal output 67 from which a signal of the picture frequency $f_b$ is obtained and a field signal output 69 from which a signal of the field frequency $f_r$ of the incoming video signal is obtained.

The line signal output 65 of the synchronizing pulse separator 63 is connected to an input 71 of a first logical circuit 73, to an input 75 of a coincidence circuit 77 and to an input 79 of a first phase detector 81. A reset input 80 of the first logical circuit 73 is connected to an output 82 of the coincident circuit 77 a further input 83 of which is connected to the image signal output 67 of the synchronizing pulse separator 63.

An output 85 of the first logical circuit 73 is connected to the operating signal input 11 of the write gate combination 5.

The first logical circuit 73 therefore provides a series of gating signals for the operating signal input 11 of the write gate combination 5, which is equal from image to image and which provides for operation of the write gate combination 5 such that during the first line period of each image writing is effected in line store 21, during the third line period in line store 23, during the fifth line period in line store 25, during the seventh line period in line store 27, during the ninth line period in line store 21 again and so forth. During the second, fourth, sixth line periods and so forth of each image no information is converted from the incoming video signal in the converter circuit.

The line stores must have a writing rate which is adapted to the number of storage elements thereof and to the line period of the video signal to be converted, which rate is obtained by applying a signal from the output 40 of the write clock signal generator 41 through a divider circuit 88 having a dividend adapted to the number of storage elements of a line store to a further input 86 of the first phase detector 81 and by controlling the write clock signal generator 41 in frequency and phase with the aid of an output voltage from this phase detector 81 to a value which corresponds to the corresponding values of the signal applied to the input 79 of the first phase detector 81.

The output 82 of the coincidence circuit 77 is furthermore connected to a reset input 87 of a second logical circuit 89 and to a reset input 91 of a divider circuit 93.

The divider circuit 93 has a further input 95 which is connected to the output 44 of the read clock signal generator 45. The divider circuit 93 has a dividend which corresponds to the number of storage elements of the line stores and applies a signal to an output 97 which signal has the line frequency $f_1$ of the video signal after conversion and which exhibits the same time schedule from image to image as a result of the reset signal at the input 91. This signal is applied to an input 99 of the second logical circuit 89 and to an input 101 of a synchronizing signal generator 103.

The second logical circuit 89 has an output 104 at which operating signals coupled to the line frequency of the video signal to be obtained are produced which signals exhibit the same pattern from image to image as a result of the reset signal at the input 87. These operating signals are applied to the operating signal input 46 of the read gate circuit 37 so that during mutually successive read periods, which never coincide and do not overlap write periods, the relevant line stores are successively read to the combination circuit 55.

Furthermore the divider circuit 93 has an output 105 to which signals of double the line frequency $2f_1$, of the video signal to be obtained are produced which are applied to an input 107 of the synchronizing signal generator 103 for obtaining equalizing pulses during the field flyback periods of the converted signal.

Furthermore the synchronizing signal generator 103 has an input 109 to which signals of picture frequency originating from the output 82 of the coincidence circuit 77 are applied, and an input 111 to which field frequency signals originating from the output 69 of the synchronizing pulse separator 63 are applied. An output 113 of the synchronizing signal generator 103 is connected to the input 57 of the combination circuit 55 and provides the complete new synchronizing signal for the converted video signal which is applied in the combination circuit 55 to this circuit and replaces the previous synchronizing signal.

The read clock signal generator 45 must provide a signal of a frequency and phase which is adapted to the line period of the converted video signal and to the number of storage elements of the line stores. The read clock signal generator 45 is therefore controlled in frequency and phase by a voltage originating from an output of a second phase detector 115 having an input 117 which is connected through a frequency divider 119 to the output 44 of the read clock signal generator 45 and having an input 121 which is connected through a frequency divider 123 to the output 40 of the write clock generator 41. The frequency divider 119 divides by a number which is proportional to $m$ in which $m$ is the number of line periods per image of the converted video signal at the output 59, and the frequency divider 123 divides by a number which is proportional to $n$ in which $n$ is the number of line periods per image of the video signal applied to the input 1 and to be converted so that the read clock signal frequency becomes equal to $m/n$ times the write clock signal frequency.

The time diagram of the conversion by means of the circuit according to FIG. 1 will now be described with reference to FIG. 2. The line numbers seen in a time sequence and the instants of commencement and termination of the line periods in the video signal to be converted are shown in the upper part of the Figure and the corresponding data of the converted signal are shown in the lower part.

The engagement of line store 21 is shown at LG 21. An uninterrupted solid horizontal line denotes the write periods and a horizontal broken line denotes the read periods. The same data for the line stores 23, 25 and 27 are shown at LG 23, LG 25, LG 27, respectively.

Firstly it will be explained how in this case the number of line stores to be used is to be chosen.

The line period is of the original system $T_1$, that of the new system is $T_1$, in which $T_{1'} = n/m\ T_1$. Per line period of the new system this yields a difference of $2T_1 - n/mT_1 = \Delta$ with the double line period of the old system. The read periods for the new system will therefore every time approach the end of the write period over a time $\Delta$ per line period of the new system. In a system which can be continuously read a discontinuity can only be admitted during the exchange of the fields so that not only the write and read periods $T_1$ and $T_1'$ of the stores but also an extra period of substantially one-half $m.\Delta$ as a stand-by period between a write and a read period must be available at the commencement of a field. At the end of this field this standby period has become zero. The period of engagement of a line store at the commencement of this field is then approximately $T_1+T_{1'} \quad +\frac{1}{2}m\cdot\Delta = T_1+n/mT_1+\frac{1}{2}m\cdot 2m-n/m\ T_1 = (1+n/m+m-\frac{1}{2}n)T_1 \approx (3+m-\frac{1}{2}n)T_1$. The number of line stores to be used is related to this period of engagement.

It will be readily evident that when using a number of $x$ line stores which are written and read in the manner described a period of engagement can be admitted of $xT_1$, which is substantially $2x \cdot T_1$.

The number of line stores to be used now directly follows from the two equations found for the period of engagement and has the value of $2 + \frac{1}{2} (m - \frac{1}{2}n - 1)$ rounded off upwards.

Figure 2:
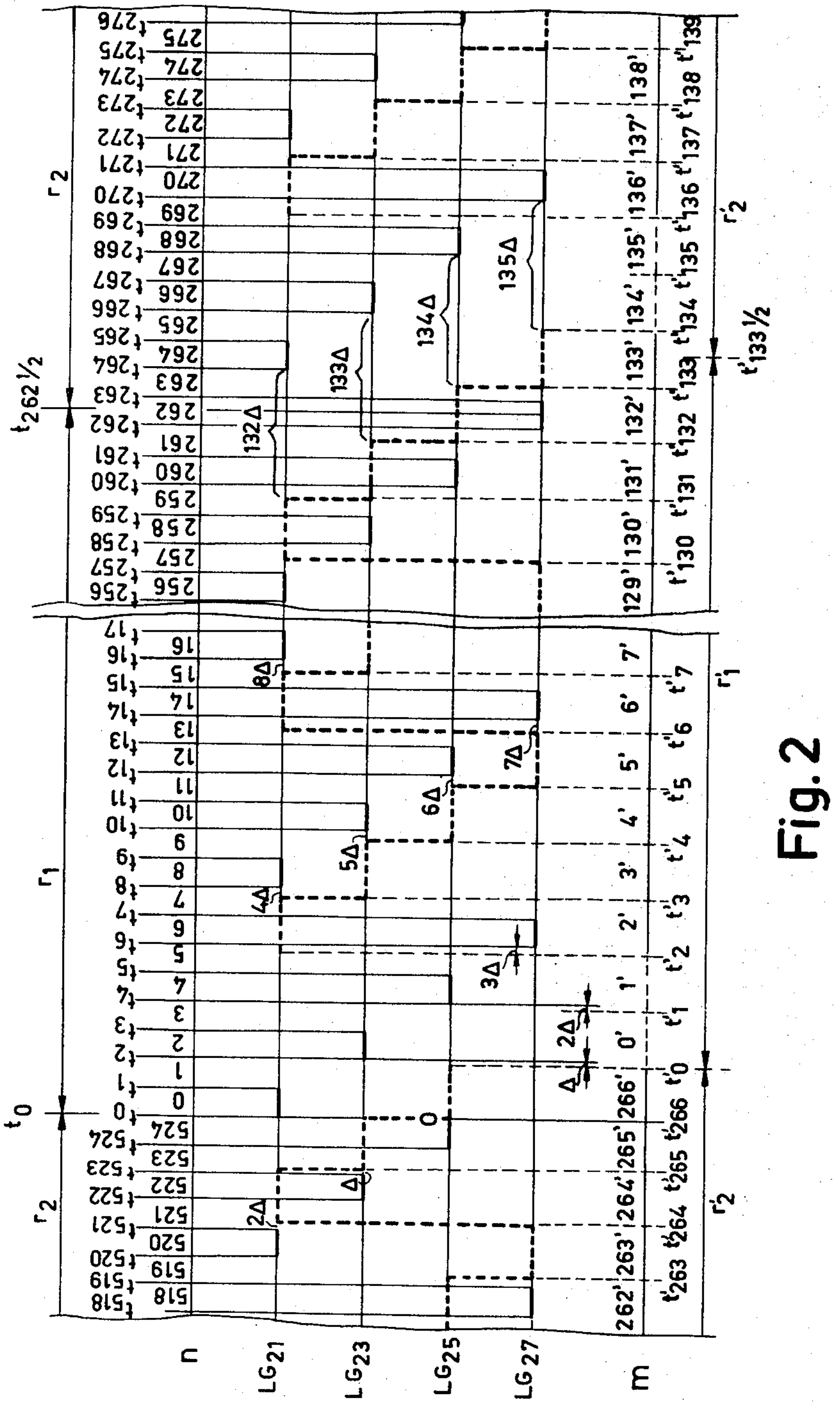
FIG. 2 shows by way of a time diagram the write and read procedures of a line standard converter according to FIG. 1.

FIG. 2 shows the reduction of the period of engagement by denoting the increasing differences between the read instants and the subsequent write instants by 3Δ, 4Δ, 5Δ, and so forth. The write periods of successive line stores are spaced one line period apart. The read periods adjoin one another. During the fild exchanges read gaps occur, because the line number of the converted video signal is larger than half that of the signal to be converted so that there is no information for the conversion available for a number of lines. These lines occur during the field flyback periods so that no disturbing phenomena occur in the image. The two first complete lines of each field of the converted signal have no information, namely the lines 0' and 1' and 134' and 135'. Writing only exhibits a discontinuity during the exchange of the image. The lines 524 and 0 are subsequently each written in a different line store, thus without an interspace of one line period. This has the advantage that the lowest frequency in the converted signal is not reduced by half so that there are no troublesome phenomena in case of a display thereof.

For the first field there applies: for the write periods:

Commencement: $2\,p\,T_1$ $p$=the number 0, 1, 2, . . . . . . . 131 of the write period during the first field end: $(2p+1)T_1$ for the read periods corresponding to the above-mentioned write periods:

Commencement: $(p + 3)\ T_{1'}$ end: $(p + 4)\ T_{1'}$ ,

For the second field there applies:

for the write periods:

commencement: $(2p + 264)\ T_1$ p = the number 0, 1, 2, . . . . .130 of the write period during the second field.

end: $(\mathbf{25+265})T_1$ for the read periods corresponding to the write periods:

commencement: $(p + 137)\ T_{1'}$ end: $(p + 138)\ T_{1'}$

The block diagram of FIG. 1 is also generally usuable for conversion ratios of a television system having a line number of $n$ into a system having a line number of $m$ per image while maintaining the picture frequency for both $m \approx \frac{1}{2}\,n$ and $m \approx \mathbf{2}n$ and the number of line stores, while the write and read periods and the number of storage elements used per line store are adapted.

Figure 3:
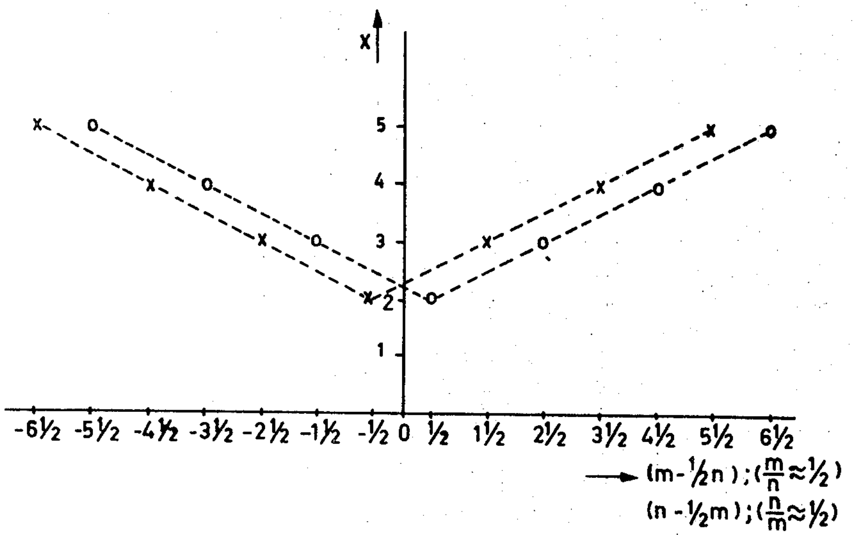
FIG. 3 shows by way of a graph the required number of delay lines for line standard converter according to the invention as a function of the value of $(m - \frac{1}{2}n)$ or $(n - \frac{1}{2}m)$.

A further consideration of the number of line stores for different possible values of $m$ and $n$ suitable for normal television systems yields for $x$ the values as shown in FIG. 3 in which these are plotted as a function of $(m - \frac{1}{2}n)$ for $m/n \approx \frac{1}{2}$ and of $(n - \frac{1}{2}i\ m)$ for $n/m \approx \frac{1}{2}$. The values denoted by an open dot (°) apply for $n = 4k + 1$ ($k$ pos. integer) when $m \approx \frac{1}{2}n$ and for $m = 4k + 1$ when $n \approx \frac{1}{2}m$. The cross-referenced ($x$) values apply for $n = 4k - 1$ when $m \approx \frac{1}{2}n$ and for $m = 4k - 1$ when $n \approx \frac{1}{2}m$.

When $m \approx 2n$ a circuit may be included at the output 59 of the circuit arrangement, which circuit may provide a repetition during one line period of a signal occurring during a previously line period such as, for example, a parallel arrangement of an undelayed signal path and a signal path delaying by one line period. Furthermore the number of line stores and the gate combinations are to be adapted. In case of conversion of a television signal of 267 lines to a television signal of 525 lines per image the number of line stores to be used is also four.

In a converter circuit in which approximately 50 percent of a given line number is converted a circuit arrangement for the adaptation of the vertical definition will be included before the input 3 of the write gate combination 5 so as to avoid given interferences as a result of the limitation of this vertical definition due to the limitation of the line number. This may be, for example, a parallel arrangement of an undelayed signal path and a signal path delaying by one line period.

Furthermore it may be advantageous to remove the synchronizing signals prior to the introduction of the signal into the write gate combinations by means of amplitude selection or in the first gating circuit 7 of the write gate combination 5 by means of time selection from the video signal to be converted and to limit the bandwidth of the video signal to be converted, in case of conversion to a ower number of lines.

Figure 4:
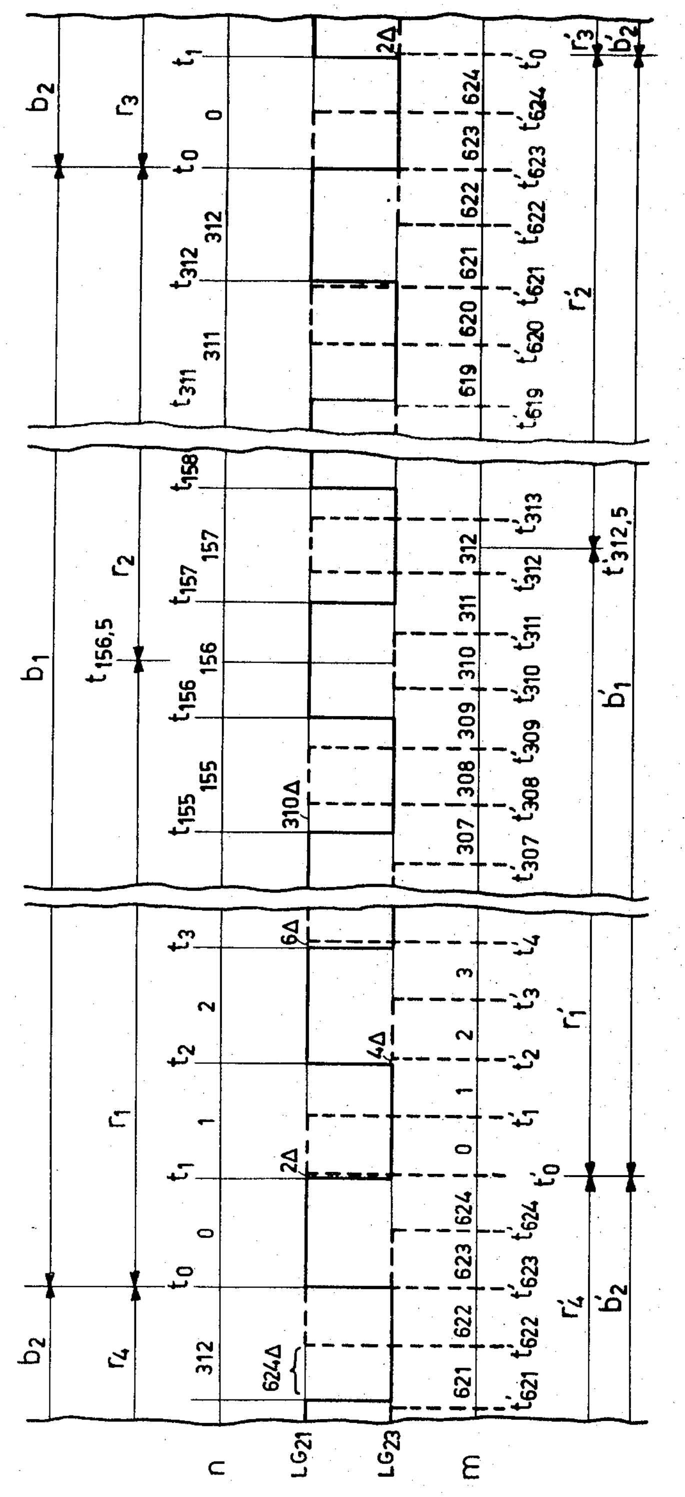
FIG. 4 shows by way of a time diagram the write and read procedure of a line standard converter from $n$ = 313 to $m$ = 625 having only two delay lines.

In FIG. 4, analogously as in FIG. 2, the time diagram is shown for a conversion from 313 to 625 lines in which the read periods cover approximately half the duration of the write periods. In that case the read clock signal frequency must be higher than the write clock signal frequency.

Only two line stores LG21 and LG23 and a gating combination adapted thereto are required.

The write cycle is completely regular, the read cycle exhibits, every time during the image exchanges, a step in the stand-by period, which decreases from the maximum value to zero. In this case it is not necessary that a step occurs in the stand-by period during the field exchange.

The line period of the converted television signal $T_{1'}$ is slightly longer than half the line period $T_1$ of the original television signal, namely $(T_{1'} - \frac{1}{2}T_1) = n/m - \frac{1}{2}T_1 = n - \frac{1}{2}m/mT_1$. The stand-by period between writing and reading of a line store is to increase from line to line of the original signal by the double value of this amount and, when there is no standby period, it is thus at a maximum at the last line for the image exchange, hence after (n-1) line periods and is $T_1 + T_{1'} + 2(n-1)/m\ (n - \frac{1}{2}m)T_1 = \{1 + n/m + 2 \cdot n - 1/m\ (n - \frac{1}{2}m)\}T_1$ $n = \frac{1}{2}m + \frac{1}{2}$ or $m = 2n - 1$. $\{1 + \frac{1}{2}m + \frac{1}{2}/m + 2\frac{1}{2}m + \frac{1}{2} - 1/m\ (\frac{1}{2}m + \frac{1}{2} - \frac{1}{2}m)\}\ T_1$ $= \{1 + \frac{1}{2} + 1/2m + 2(\frac{1}{2} - 1/2m)\ (\frac{1}{2})\}\ T_1$ $= 2\ T_1$ This shows that in this case exactly two line stores are sufficient to admit only a step in the stand-by period during an image exchange.

It will be evident that in the given embodiments the minimum number of line stores is used and that, if desired, the number can be taken to be larger.

In the embodiment of FIG. 1 the write and read clock signal generators are coupled together through a phase control loop to the frequency dividers 119 and 123 and the phase detector 115. It will be evident that, for example, other methods of coupling are alternatievly possible.

A survey will hereinafter be given of the minimum number of line stores $x$ to be chosen for all possible cases.

I) $m = ½n + ½ + q$ $x = 2 + ½q$ for $q = 0, 2, 4.....$ (even) when $n = 4k+1$ $x = 2½ + ½q$ for $q = 1, 3, 5....$ (odd) when $n = 4k - 1$ II) $m = ½n - ½ - q$ $x = 2 + ½q$ for $q = 0, 2, 4.....$ (even) when $n = 4k - 1$ $x = 2½ + ½q$ for $q = 1, 3, 5....$ (odd) when $n = kk + 1$ III) $m = 2n - 1 - 2q\ 2q$ $x = 2 + ½q$ for $q = 0, 2, 4......$ (even) when $m = 4k + 1$ $x = 2½ + ½q$ for $q = 1, 3, 5......$ (odd) when $m = 4k - 1$ IV) $m = 2n + 1 + 2q$ $x = 2 + ½q$ for $q = 0, 2, 4......$ (even) when $m = 4k - 1$ $x = 2½ + ½q$ for $q = 1, 3, 5......$ (odd) when $m = 4k + 1$.

What is claimed is:

1. A line standard converter for converting a first television signal having a number of lines per image into a second television signal having a selected number of lines per image while maintaining the number of images per second, said converter comprising a television signal input means for receiving said first signal, a switchable storage circuit coupled to said input means comprising a plurality of switchable line stores, means for writing said input signal into said stores in a selected period, means for reading a signal from said stores in a selected period, the write period having a value differing from the read pereiod, said reading and writing means comprising means for effecting the conversion ratio of the line standard converter between $n$ and $m$ substantially equal to ½, said plurality of line stores being at least equal to (2 + ½q) for $q$ equals zero or a positive even number and being equal to (2 ½ + ½q) for $q$ equals a positive odd number, in which $q$ for $m$ greater than ½$n$ is equal to $m$ - ½$n$ - ½ and for $n$ less than ½$m$ is equal to ½$n$ - $m$ - ½, wherein for a value of $n$ which is one less than a multiple of 4, $q$ is odd when $m$ is greater than ½$n$ and $q$ is even when $m$ is less than ½$m$ and for a value of $n$ which is one more than a multiple of four q is odd when $m$ is less than ½$n$ and $q$ is even when $m$ is greater than ½n, m being one of said number of lines per image and $n$ being the remaining one of said number of lines per image.

2. A line standard converter as claimed in claim 1, wherein $n$ equals 625, $m$ equals 313 the number of line stores being equal to two.

3. A line standard converter as claimed in claim 1, wherein $n$ equals 525, $m$ equals 267, the number of line stores being equal to four.

4. A line standard converter as claimed in claim 1 wherein $n$ equals 313, $m$ equals 625, the number of lines stores being equal to two.

5. A line standard converter as claimed in claim 1 wherein $n$ equals 267, $m$ equals 525, the number of line stores being equal to four.

6. A converter as claimed in claim 1 wherein $n$ equals the number of lines per image of said first signal and $m$ equals the number of lines per image of said second signal.

7. A converter as claimed in claim 1 wherein $n$ equals the number of lines per image of said second signal and $m$ equals the number of lines per image of said first signal.

* * * * *